United States Patent
Tucker

(10) Patent No.: US 10,914,128 B2
(45) Date of Patent: *Feb. 9, 2021

(54) DIFFUSER AND SOLIDS COLLECTION AND MEASUREMENT SYSTEM FOR USE IN CONJUNCTION WITH OIL AND GAS WELLS

(71) Applicant: Southpaw Fabrication, Odessa, TX (US)

(72) Inventor: Robert Alan Tucker, Odessa, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/506,975

(22) Filed: Jul. 9, 2019

(65) Prior Publication Data

US 2019/0368288 A1 Dec. 5, 2019

Related U.S. Application Data

(63) Continuation of application No. 16/272,805, filed on Feb. 11, 2019, now Pat. No. 10,385,635.

(60) Provisional application No. 62/680,995, filed on Jun. 5, 2018.

(51) Int. Cl.
  *B01D 21/30* (2006.01)
  *E21B 43/34* (2006.01)
  *E21B 21/06* (2006.01)
  *B01D 21/00* (2006.01)

(52) U.S. Cl.
  CPC .......... *E21B 21/066* (2013.01); *B01D 21/003* (2013.01); *B01D 21/0042* (2013.01); *B01D 21/30* (2013.01); *E21B 43/34* (2013.01)

(58) Field of Classification Search
  CPC ...... E21B 21/065; E21B 21/066; E21B 43/34; B01D 21/003; B01D 21/0042; B01D 21/245; B01D 21/30

USPC ....... 210/86, 113, 170.01, 521, 532.1, 747.1, 210/801; 175/66, 206; 166/75.12, 267; 73/152.04

See application file for complete search history.

(56) References Cited

U.S. PATENT DOCUMENTS

| | | | | |
|---|---|---|---|---|
| 1,190,863 A | * | 7/1916 | Come | B01D 21/245 210/521 |
| 3,899,926 A | * | 8/1975 | Haden | E21B 49/005 73/152.04 |
| 4,247,312 A | * | 1/1981 | Thakur | B01D 19/0042 210/522 |
| 4,878,382 A | * | 11/1989 | Jones | E21B 21/08 73/152.04 |
| 5,106,492 A | * | 4/1992 | Distinti | E04H 4/1263 210/113 |
| 6,410,862 B1 | * | 6/2002 | Lecann | E21B 21/065 177/17 |
| 6,823,238 B1 | * | 11/2004 | Hensley | E21B 21/06 210/113 |

(Continued)

FOREIGN PATENT DOCUMENTS

GB 2228215 * 8/1990

*Primary Examiner* — Christopher Upton
(74) *Attorney, Agent, or Firm* — James J. Murphy

(57) ABSTRACT

A diffuser and solids collection system includes an enclosure including an input for receiving from a petroleum well a stream of fluid carrying solids. A set of baffles within the enclosure reduces the velocity of the stream of fluid. A solids collector in fluid communication with the enclosure receives the stream of fluid after the reduction in the velocity of the fluid by the set of baffles. A weighing system coupled to the solids collector for weighing the collected solids.

15 Claims, 9 Drawing Sheets

(56) References Cited

U.S. PATENT DOCUMENTS

| | | | |
|---|---|---|---|
| 7,311,818 B1* | 12/2007 | Gurfinkel | B01D 21/30 210/521 |
| 7,363,829 B2* | 4/2008 | Rieberer | E21B 21/065 73/152.04 |
| 7,964,101 B2* | 6/2011 | Slough | E21B 21/065 175/66 |
| 9,610,520 B2* | 4/2017 | Onstad | B01D 21/003 |
| 10,385,635 B1* | 8/2019 | Tucker | B01D 21/0042 |
| 2006/0096935 A1* | 5/2006 | Harding | B01D 21/003 210/801 |
| 2014/0014589 A1* | 1/2014 | Niskakangas | E21B 21/065 210/702 |

* cited by examiner

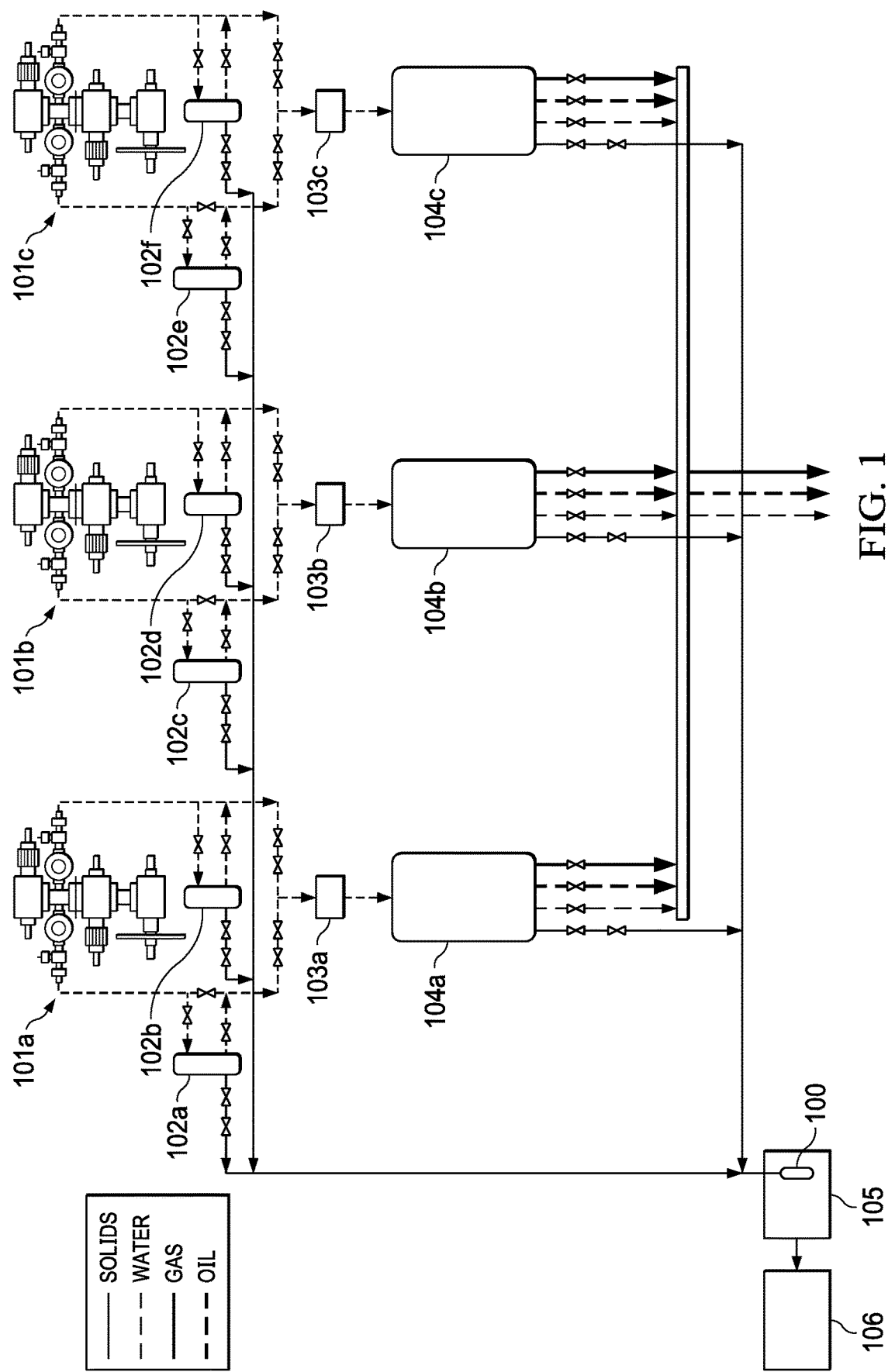

256
DIFFUSER AND SOLIDS COLLECTION AND MEASUREMENT SYSTEM FOR USE IN CONJUNCTION WITH OIL AND GAS WELLS

CROSS-REFERENCE TO RELATED APPLICATIONS

The present application is a continuation of U.S. patent application Ser. No. 16/272,805, filed Feb. 11, 2019, which claims the benefit of U.S. Provisional Patent Application Ser. No. 62/680,995, filed Jun. 5, 2018, both of which are incorporated herein in their entirety for all purposes.

FIELD OF INVENTION

The present invention relates in general to oil and gas operations and in particular to a diffuser and solids collection and measurement system for use in conjunction with oil and gas wells.

BACKGROUND OF INVENTION

In a typical oil well, the oil, gas, water, and solids are produced at the wellhead and then separated. The oil, gas, and usable amounts of water are sent for sale or reuse. The solids, which may include solids such as fracing proppants (e.g., frac sand), are sent to a solids tank for recovery.

In many instances, the amount of solids being output from a given well or group of wells must be monitored. Current methods are based on rough estimates made by personnel observing the output being discharged into the tank. And while it would be advantageous to provide a more accurate and efficient method of determining the amount of solids being produced by a well, the nature of wellhead operations presents some significant challenges for achieving that goal. For example, the solids-bearing water is typically produced under pressure and is therefore discharged it at a high velocity.

SUMMARY OF INVENTION

The principles of the present invention are embodied in a diffuser and solids collector system that provides for the collection of solids discharged from a wellhead and the accurate measurement (e.g., weighing) of the collected solids.

One particular embodiment of these principles is a diffuser and solids collection system, which includes a first baffle section having an input for receiving from a petroleum well a fluid carrying solids and a first set of internal baffles for reducing a velocity of the fluid. A second baffle section in fluid communication with the first baffle section has a second set of internal baffles for further reducing the velocity of the fluid. A solids collection container separates the solids from the fluid received from the second baffle section. A weighing system, supported by the second baffle section and supporting the solids collection container, weighs the solids collected in the solids collection container.

Advantageously, the principles of the present invention allow for an accurate measurement of the solids flowing out of a petroleum well under pressure.

BRIEF DESCRIPTION OF DRAWINGS

For a more complete understanding of the present invention, and the advantages thereof, reference is now made to the following descriptions taken in conjunction with the accompanying drawings, in which:

FIG. 1 depicts a representative petroleum well serviced by a diffuser and solids collector system according to the principles of the present invention;

DETAILED DESCRIPTION OF THE INVENTION

The principles of the present invention and their advantages are best understood by referring to the illustrated embodiment depicted in FIGS. 1-7 of the drawings, in which like numbers designate like parts.

FIG. 1 is a diagram of an exemplary petroleum well system including a diffuser and solids collector system 100 embodying the present of the present invention. FIG. 1 shows three (3) petroleum production wells 101a-101c, corresponding water/solids separators 102a-102f, valve manual manifolds 103a-103c, four-phase separators 104a-104c, solids tank 105, and open top tank 106. In other systems, the manifolds may be choke manifolds and the separators 2- or 3-phase separators.

Solids-bearing water from water/solids separators 102a-102f and four phase separators 104a-104c are passed to diffuser and solids collector system 100. As discussed in further detail below, the water bearing solids, such as frac sand, are delivered diffuser and solids collection system 100, which reduces the fluid velocity, collects the solids, and allows the solids to be weighed. Once a desired amount of solids have been collected an weighed, they are discharged from diffuser and solids collector system 100 into solids tank 105.

Figure 2A:
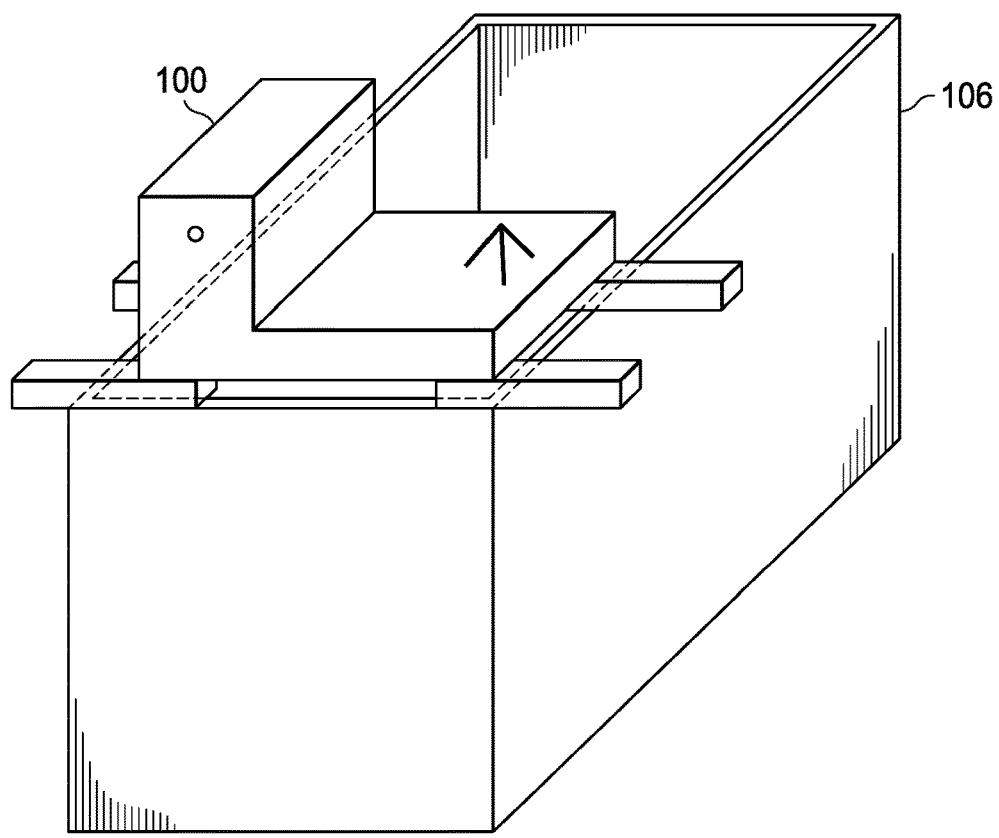
FIG. 2A is a perspective view of an exemplary embodiment of the diffuser and solids collector system FIG. 1, embodying the principles of the present invention, and as installed over the solids collection tank of FIG. 1.
Figure 2B:
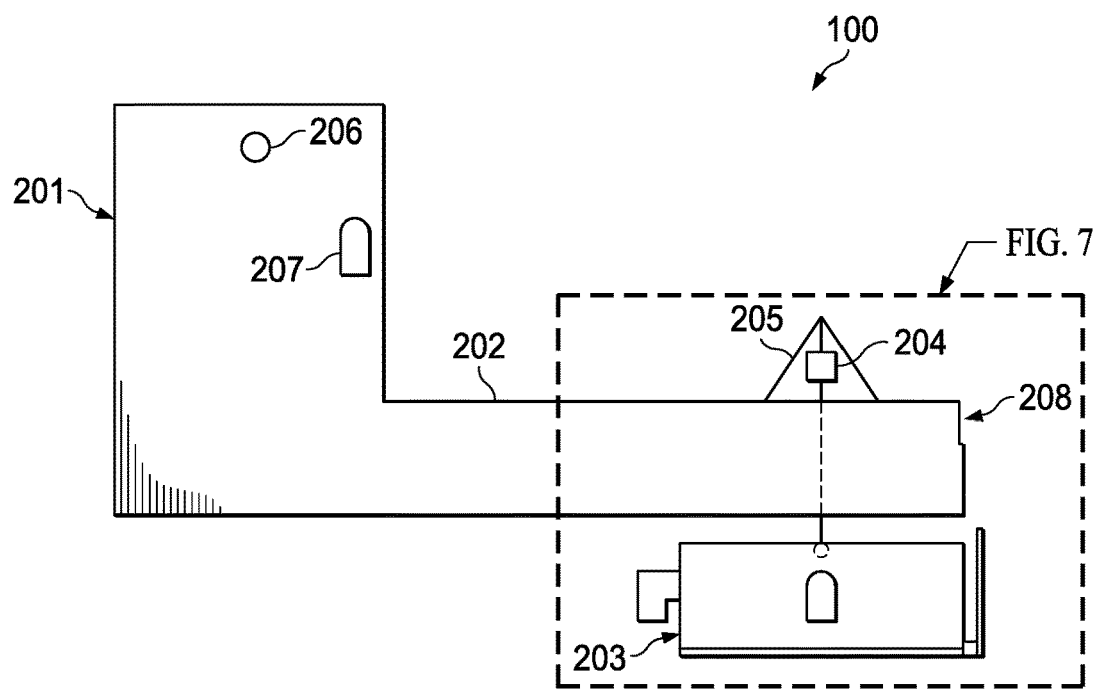
FIG. 2B is a side elevational view of the diffuser and solids collector system of FIG. 2A.

FIG. 2A partially shows a preferred embodiment of diffuser and solids collection system 100 mounted on the solids tank 106 of FIG. 1. FIG. 2B shows the exterior of diffuser and solids collector system 100 in further detail. The illustrated embodiment includes a vertical baffle section 201, a horizontal baffle section 202, and a particulate (solids) collection box 203, which is supported by a scale 204 and pyramid support structure 205.

High-velocity solids-bearing water is received through an inlet 206 near the top a vertical baffle section 201 and passes through a series of internal baffles, discussed in further detail below. Additional baffles within contiguous horizontal baffle section 202 further reduce the fluid velocity.

After the reduction in fluid velocity, the solids-bearing water is discharged through an aperture in the base of horizontal baffle section 202 and into particulate collection box 203. Particulate collection box 203 includes filter material supported by a hinged screen on the base. The hinged screen is associated with a handle and release mechanism, which allow a lateral edge of the hinged screen to be released and the collected solids to be dumped into solids tank 105 below, once those solids have been weighed by scale 204.

Figure 3:
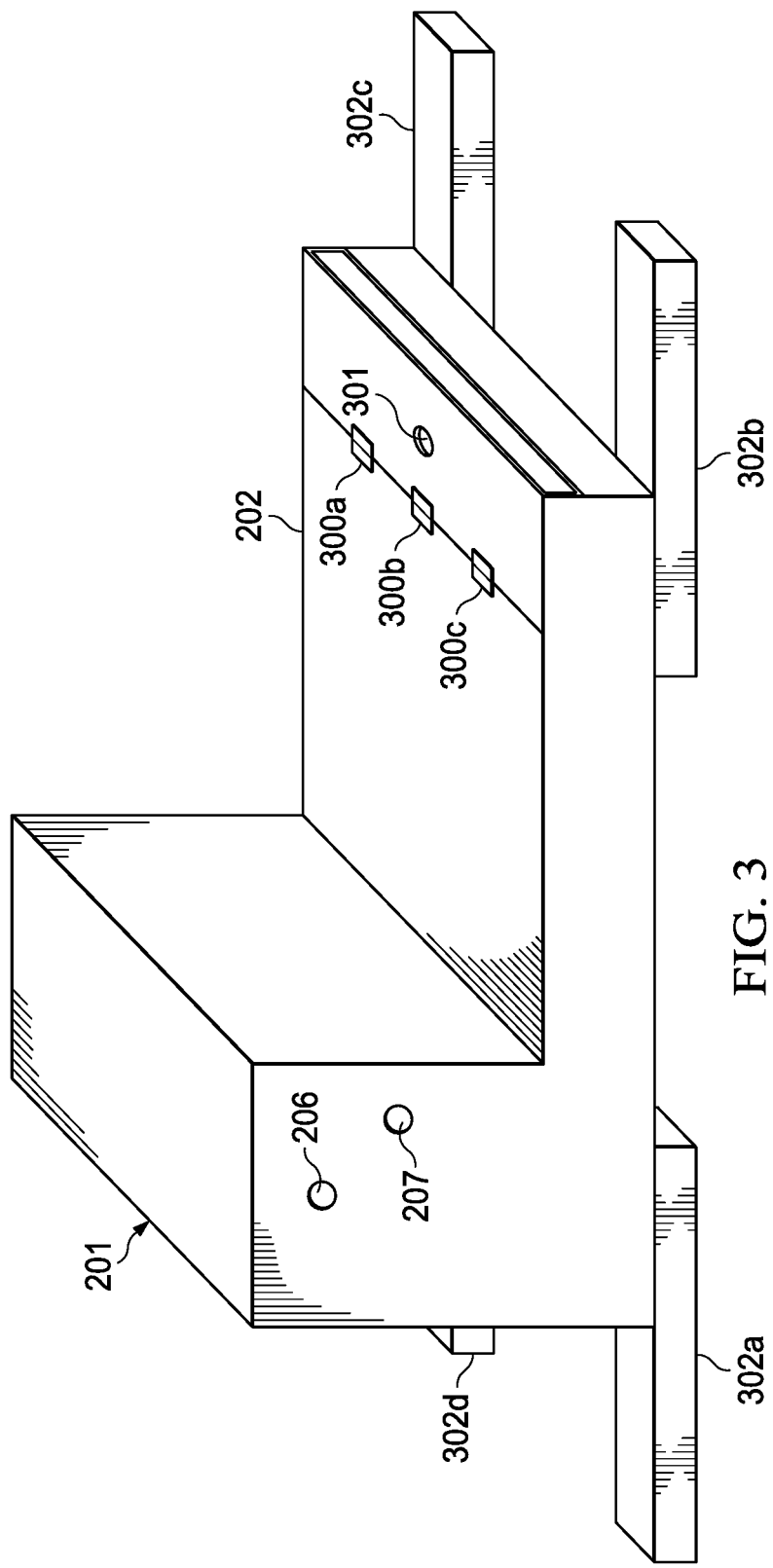
FIG. 3 is a perspective view of the diffuser and solids collector system of FIG. 2A.

FIG. 3 provides an alternate view of diffuser and solids collector system 100. Vertical baffle section 201 includes vents 207 on opposing sides for discharging gases accumulated during the diffusion process. The upper surface of the horizontal baffle section 202 includes an aperture through which a turnbuckle extends, as discussed below, to couple scale 204 with particulate collection box 203. Supports 302 at the four corners are provided for supporting diffuser and solids collector system 100 on the walls of solids tank 105 during use. Hinges 300a-300c allow a portion of the upper surface of horizontal baffle section 202 to swing open for internal access.

Figure 4A:
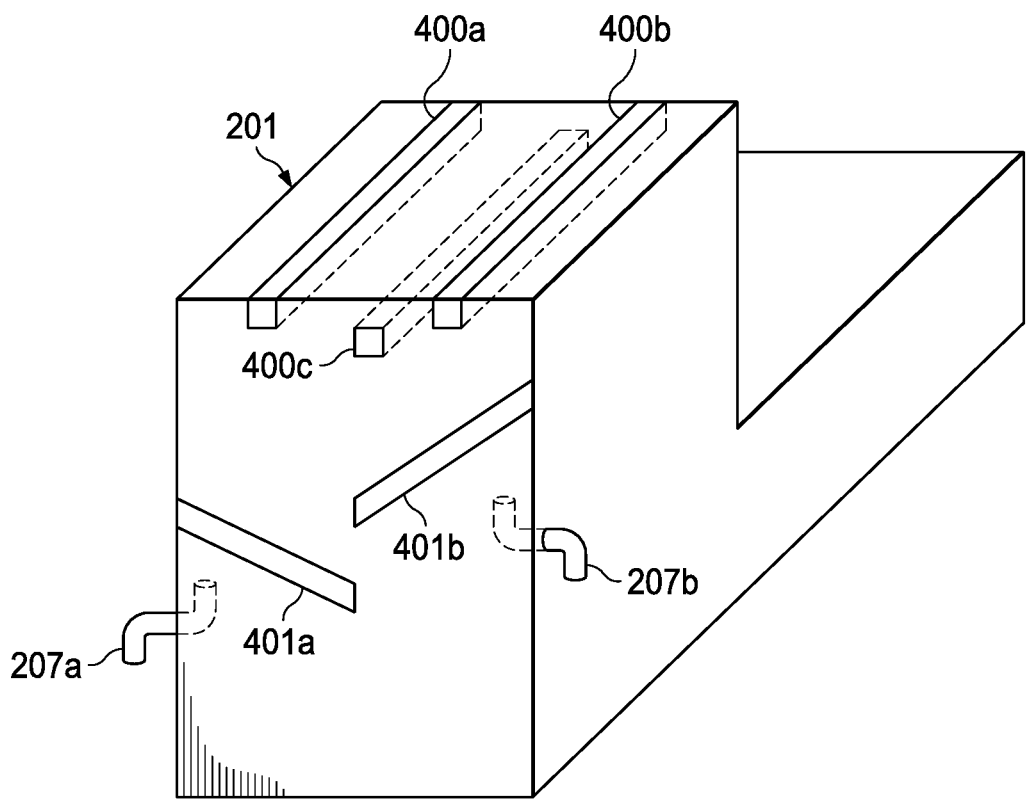
FIG. 4A is partial cutaway end view of the diffuser and solids collector system of FIG. 2A showing the internal baffles of the vertical baffle section.
Figure 4B:
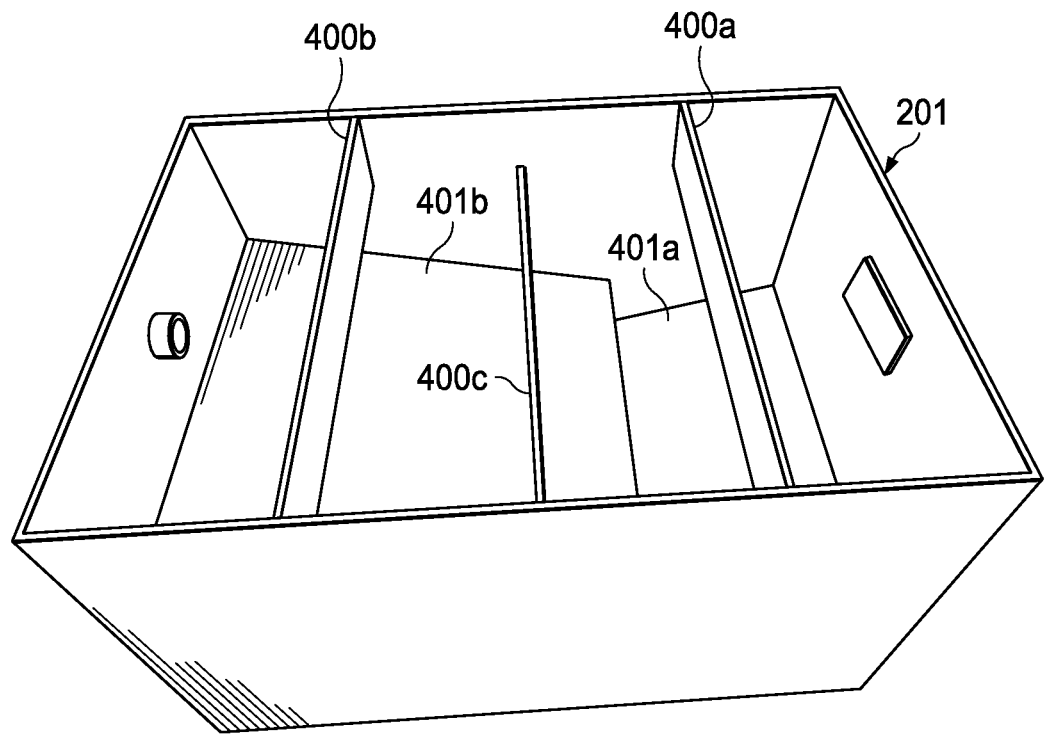
FIG. 4B is a cutaway top view of the diffuser and solids collector system of FIG. 2A showing the internal baffles of the vertical baffle section.

FIGS. 4A-4B show the preferred vertical baffle section 201 in further detail. As shown in FIGS. 4A and 4B, three (3) elongated internal rectangular baffles 400a-400c are provided near the top of vertical baffle section 201, along with two (2) slanted planar baffles 401a-401b extending from opposing sidewalls. (The principles of the present invention are not limited to this configuration, and in alternate embodiments, the number of rectangular and/or slanted baffles, as well as their positioning, may vary. In addition, the number and location of vents 207 and fluid inlet 206 may also vary in alternate embodiments.)

Figure 5:
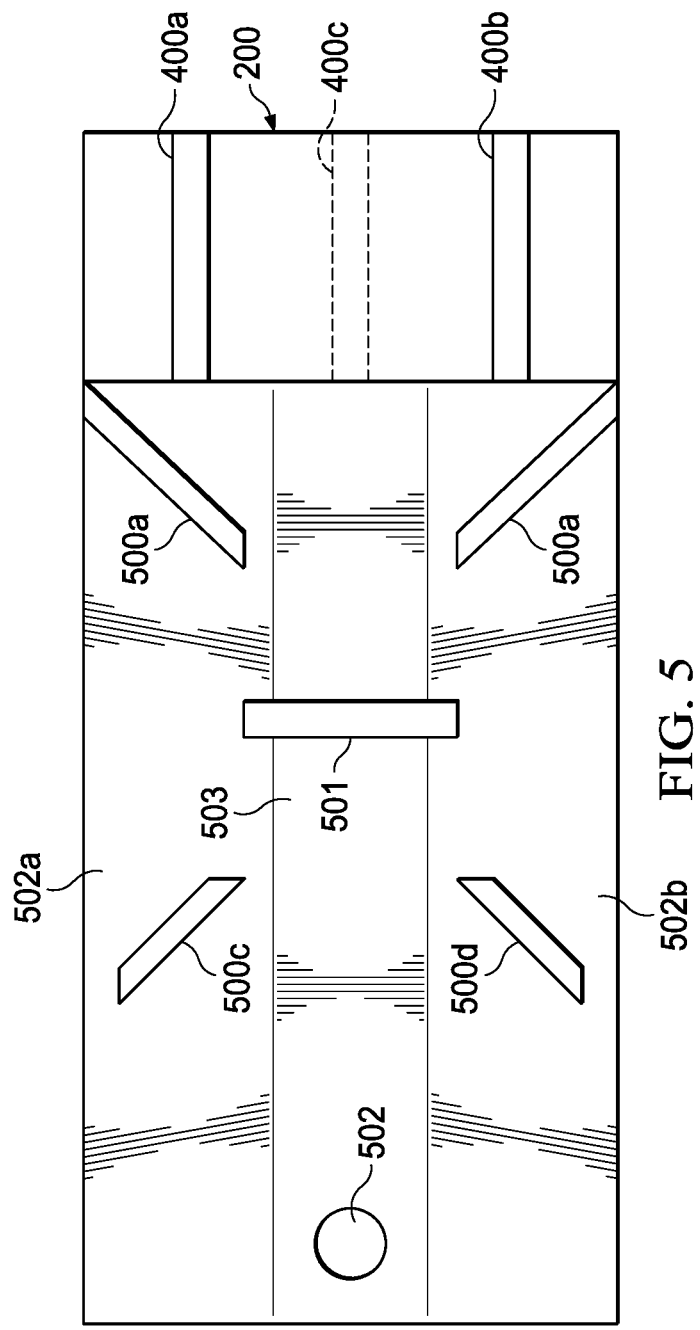
FIG. 5 is a cutaway top view of the diffuser and solids collector system of FIG. 2A showing the internal baffles of the horizontal baffle section.

A preferred configuration of horizontal baffle section 202 is shown in FIG. 5. In the embodiment, four (4) baffles 500a-500d extend upward from the angled side-sections 502a-502b of the floor and at an angle to the horizontal baffle section 202 lateral sidewalls. A rectangular baffle 501 extends upward from the flat portion 503 of the floor and perpendicular to the lateral sidewalls. In alternate embodiments, the number and configuration of the baffles of the horizontal baffle section 202 may vary. Aperture 502 through the floor allows a turn buckle to extend through the interior of horizontal baffle section 202 for coupling particulate collection box 203 with scale 204, as well as to allow solid-bearing water to discharge into particulate collection box 203.

Figure 6A:
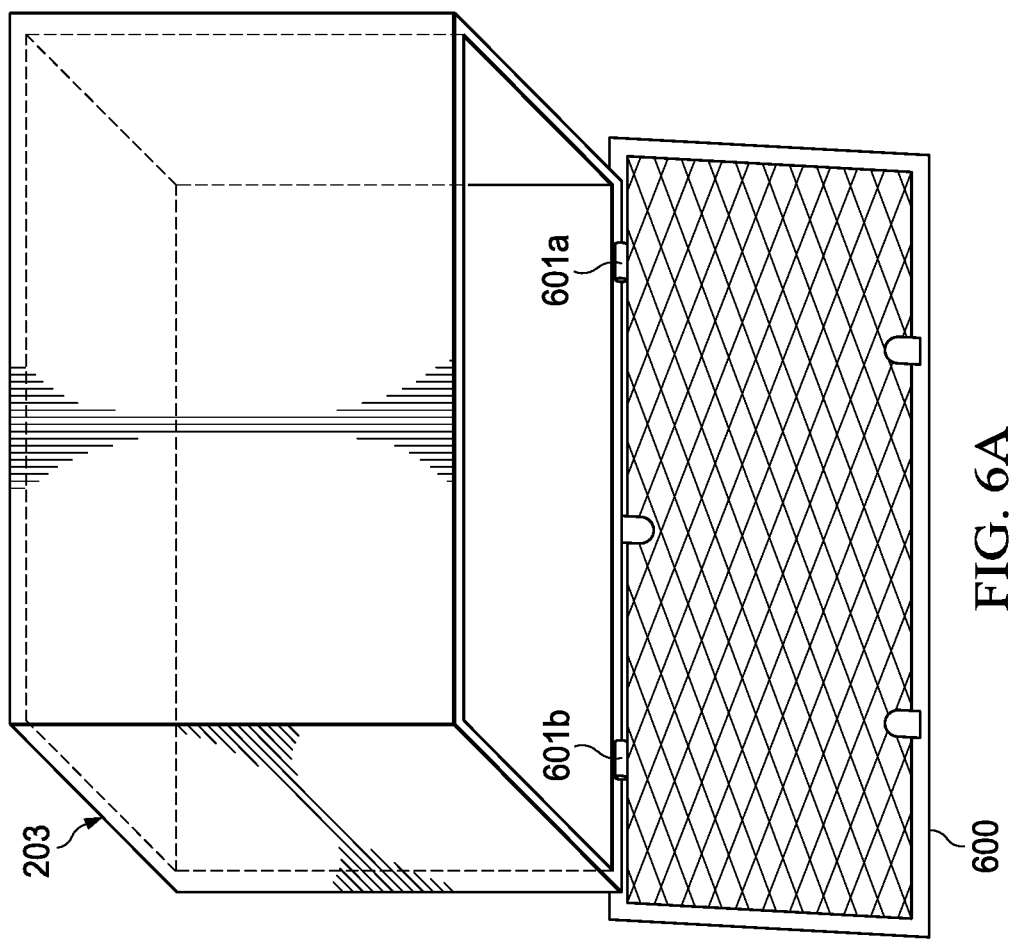
FIG. 6A is a side view of the solids collection box of the diffuser and solids collector system of FIG. 2A.
Figure 6B:
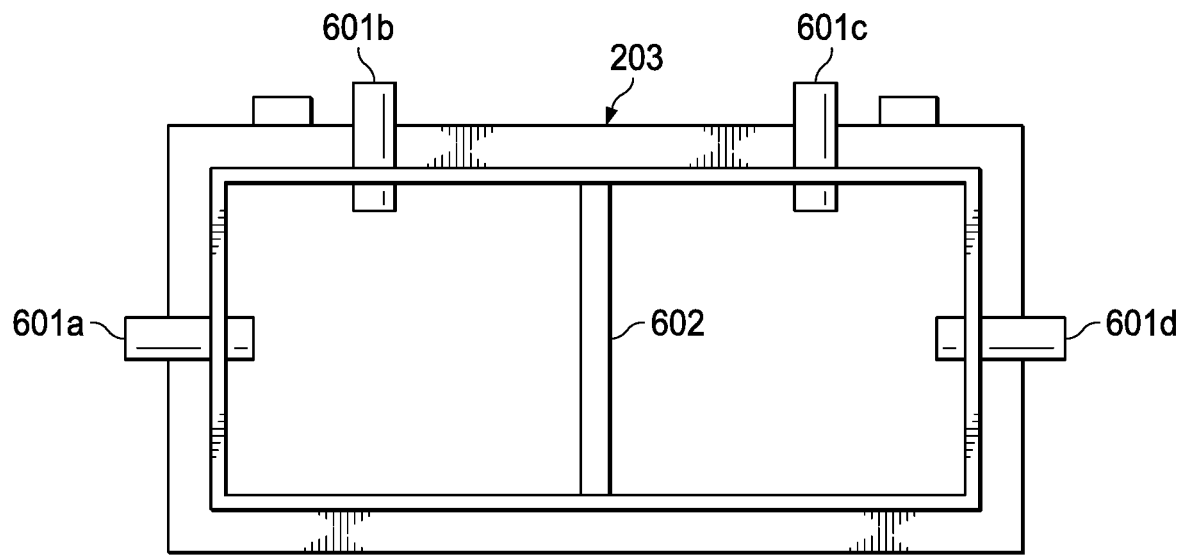
FIG. 6B is a top view of the solids collection box of the diffuser and solids collector system of FIG. 2A without the bottom release handle in place.

FIGS. 6A-6D illustrate the preferred configuration of particulate collection box 203. The bottom of the solids collection box is a hinged screen 600 as shown in FIG. 6A. A crossbar 602, as shown in FIG. 6B, provides structural support, as well as a grasping point for the turnbuckle hook. Four (4) vents 601a-601d are provided for discharging gas (FIG. 6B).

Figure 6C:
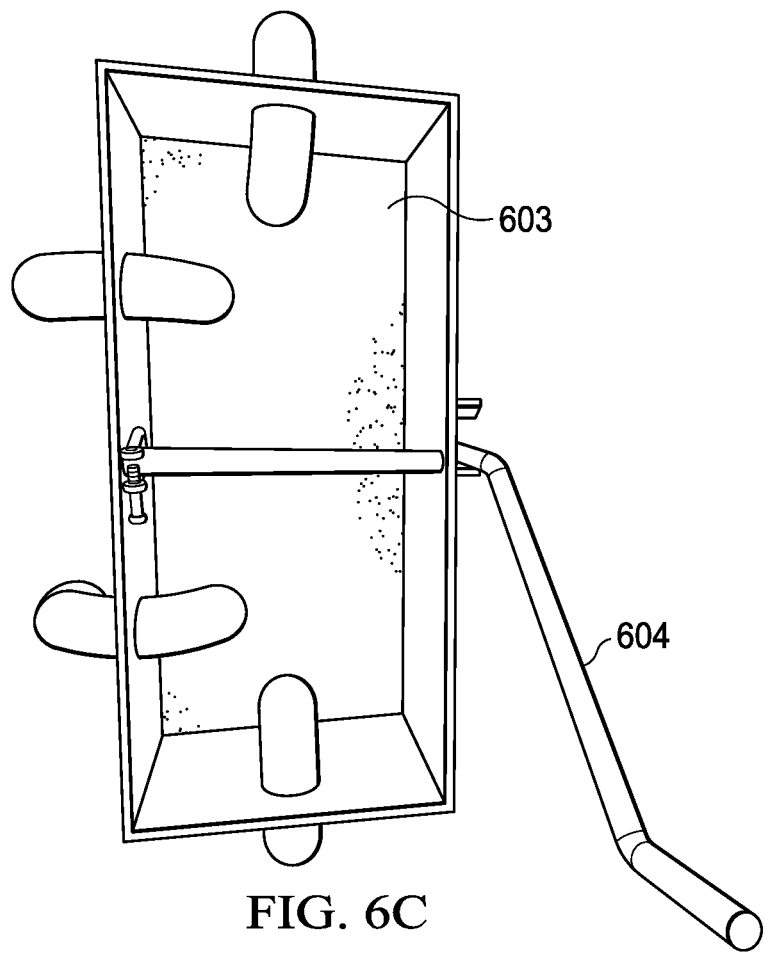
FIG. 6C is a top view of the solids collection box of the diffuser and solids collector system of FIG. 2A with the bottom release handle in place.
Figure 6D:
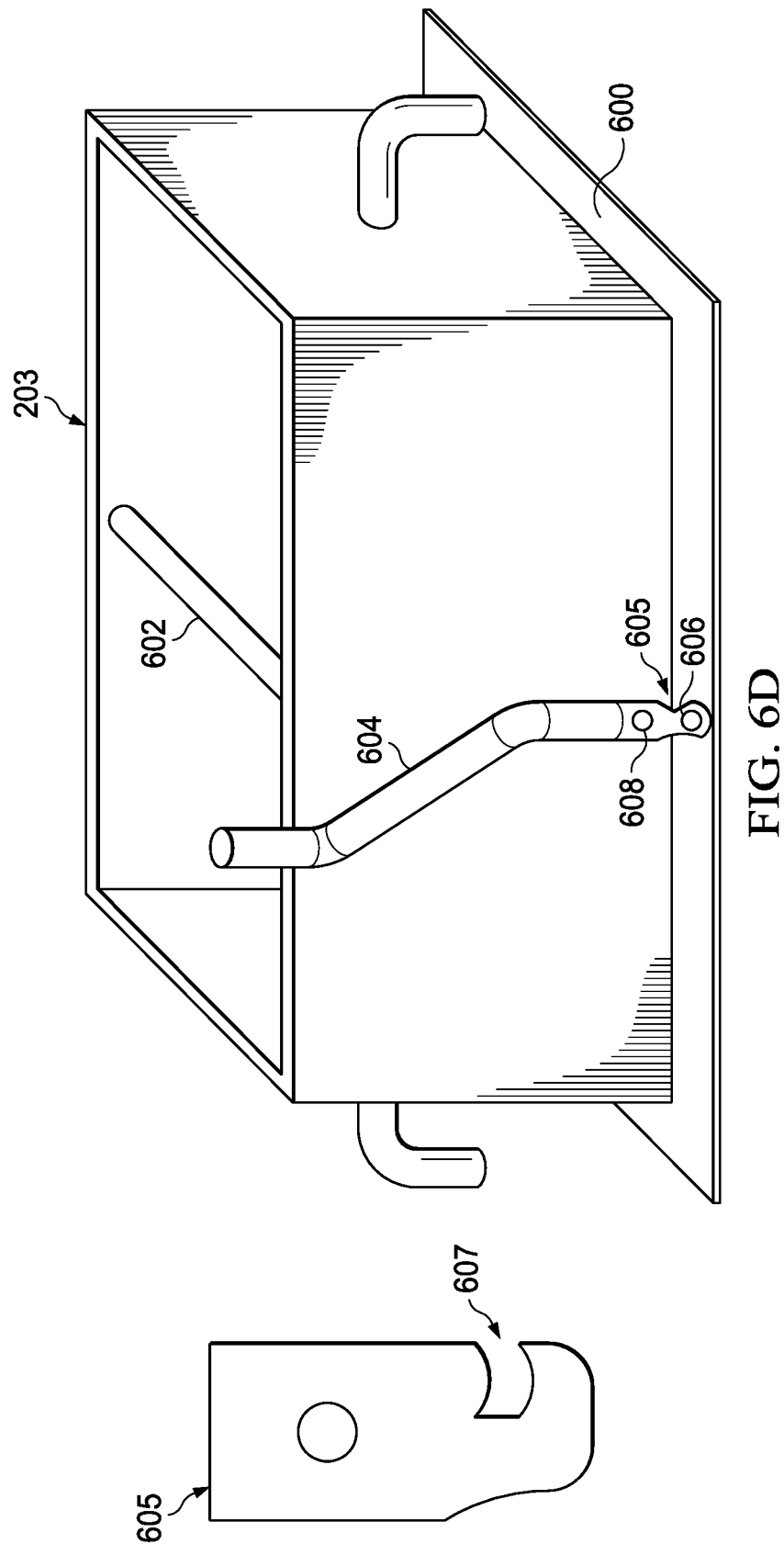
FIG. 6D is a top perspective view of the solids collection box of diffuser and solids collector system of FIG. 2A showing the bottom release mechanism.

As shown in FIG. 6C, filter material 603 is disposed across hinged screen 600 for capturing solids as water is discharged through the bottom of particulate collection box 203 into solids tank 105. Once the solids have been collected and weighed, hinged screen 600 is released using the release mechanism of FIG. 6D.

The release mechanism includes a release handle 604 and a rotating latch 605, which includes a slot 607 for engaging a pin 606 extending from the free (non-hinged) side of hinged screen 600. Rotation of the latch around pivot point 608 is controlled by handle 604. When hinged screen 600 is the closed position, pin 606 on hinged screen 600 slides into slot 607 of rotating latch 605. To release hinged screen 600, and allow the free edge to fall, handle 604 is rotated such that latch 605 rotates away from pin 606 and pin 606 exits slot 607 in the latch 605.

Figure 7:
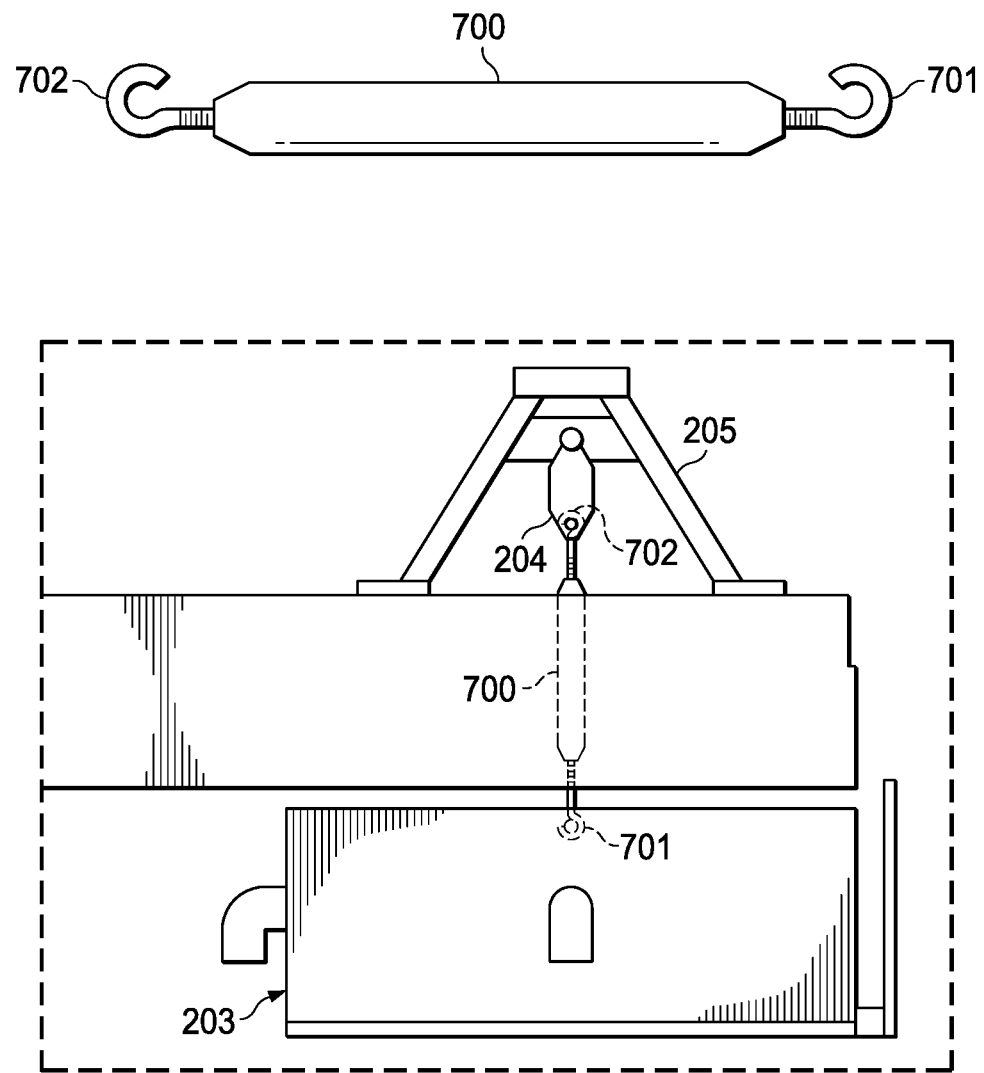
FIG. 7 is a side view of the diffuser and solids collector system of FIG. 2A showing the weighing system in further detail.

The weighing system is shown in FIG. 7 for the preferred embodiment of diffuser and solids collector system 100. A pyramid support is disposed on the upper side of the horizontal baffle section. As discussed above, pyramid support 205 supports a scale 204. A turnbuckle 700, which is coupled to scale 704 by a hook 702, extends through aperture 301 on the upper surface of horizontal baffle section 202 and aperture 502 through the floor of horizontal baffle section 202. An opposing hook 701 couples to crossbar 602 of particle collection box 203. The solids captured by particulate collection box 203 and particulate collection box 203 itself are weighed together and the tare taken to determine the weight of the solids alone.

The primary components of diffuser and solids collector system 100 including vertical baffle section 201 and internal baffles 400 and 402, horizontal baffle section 202 and internal baffles 500 and 501, and particulate (solids) collection box 203, are preferably fabricated from steel. In alternate embodiments, other materials capable of withstanding the stresses from use of diffuser and solids collector system 100 in the petroleum fields may be used.

Although the invention has been described with reference to specific embodiments, these descriptions are not meant to be construed in a limiting sense. Various modifications of the disclosed embodiments, as well as alternative embodiments of the invention, will become apparent to persons skilled in the art upon reference to the description of the invention. It should be appreciated by those skilled in the art that the conception and the specific embodiment disclosed might be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore contemplated that the claims will cover any such modifications or embodiments that fall within the true scope of the invention.

What is claimed is:

1. A diffuser and solids collection system comprising:
   an enclosure;
   an input to the enclosure for receiving from a petroleum well a stream of fluid carrying solids, the stream of fluids having a velocity;
   a set of baffles within the enclosure for reducing the velocity of the stream of fluid;
   a solids collector in fluid communication with the enclosure for receiving the stream of fluid after a reduction in the velocity by the set of baffles for collecting the solids from the stream of fluid; and
   a weighing system coupled to the solids collector for weighing the collected solids.

2. The system of claim 1, wherein the set of baffles comprises a vertical baffle section including a plurality of vertically spaced-apart baffles supported by sidewalls of the enclosure.

3. The system of claim 2, wherein the plurality of vertically spaced-apart baffles of the vertical baffle section comprise a first angled baffle extending downward from a first sidewall of the enclosure and a second angled baffle extending downward from a second opposing sidewall of the enclosure.

4. The system of claim 2, wherein the plurality of vertically spaced-apart baffles of the vertical baffle section comprise a plurality of laterally spaced apart vertically aligned baffles extending between first and second opposing sidewalls of the enclosure.

5. The system of claim 1, wherein the set of baffles comprises a horizontal baffle section including a plurality of laterally spaced baffles extending upward from a floor of the enclosure.

6. The system of claim 5, wherein the plurality of laterally spaced baffles comprise at least one baffle extending inward at an angle to a sidewall of the enclosure.

7. The system of claim 5, wherein the plurality of laterally spaced baffles extending upward from a floor of the enclosure comprise at least one baffle disposed substantially perpendicular to a sidewall of the enclosure.

8. The system of claim 1, wherein the solids collector comprises:
a container including sidewalls;
a hinged screen forming a bottom of the container; and
a latching mechanism for latching the hinged screen in a closed position during the collection of the solids and releasing the hinged screen to discharge the collected solids from the container.

9. The system of claim 1, wherein the weighing system suspends the solids collector below the enclosure.

10. The system of claim 9, wherein the weighing system comprises:
a support structure supported by an upper surface of the enclosure;
a scale supported by the support structure; and
a coupling mechanism coupled to the scale and extending through apertures through upper and lower walls of the enclosure to couple with the solids collections container.

11. A method of collecting solids from a stream of fluid produced by a petroleum well comprising:
reducing a velocity of the stream of fluid with a plurality of baffles disposed within an enclosure;
after the reduction in velocity of the fluid, collecting the solids from the fluid with a solids collector in fluid communication with the enclosure; and
weighing the collected solids with a weighing system, the weighing system including a scale suspending the solids collector below the enclosure.

12. The method of claim 11, wherein reducing the velocity of the stream of fluids comprises reducing the velocity of the stream of fluids with a plurality of vertically spaced baffles disposed within the enclosure.

13. The method of claim 11, wherein reducing the velocity of the stream of fluids comprises reducing the velocity of the stream of fluids with a plurality of horizontally spaced baffles disposed within the enclosure.

14. The method of claim 11, wherein reducing the velocity of the stream of fluids comprises reducing the velocity of the stream of fluids with a plurality of vertical baffles in series with a plurality of horizontal baffles.

15. The method of claim 11, wherein weighing the collected solids comprises weighing the collected solids with a weighing system including a scale suspending the solids collector from the enclosure.

* * * * *